United States Patent [19]
Lau

[11] Patent Number: 6,032,400
[45] Date of Patent: *Mar. 7, 2000

[54] FISHING LURE ASSEMBLY

[76] Inventor: Richard Lau, 2723 Connecticut Ave., Pittsburgh, Pa. 15216

[*] Notice: This patent is subject to a terminal disclaimer.

[21] Appl. No.: 09/172,391

[22] Filed: Oct. 14, 1998

Related U.S. Application Data

[63] Continuation-in-part of application No. 09/013,255, Jan. 26, 1998, Pat. No. 5,822,913
[60] Provisional application No. 60/039,163, Feb. 26, 1997.
[51] Int. Cl.⁷ .................................................. A01K 85/00
[52] U.S. Cl. ............................................ 43/42; 43/42.26
[58] Field of Search ........................... 43/42.24, 42.26, 43/42.28, 42.29, 42.3, 42.37, 42.38

[56] References Cited

U.S. PATENT DOCUMENTS

| | | |
|---|---|---|
| 1,540,586 | 6/1925 | Adam . |
| 2,389,883 | 11/1945 | Worden . |
| 2,607,151 | 8/1952 | Morris et al. . |
| 3,105,317 | 10/1963 | Fox . |
| 4,516,352 | 5/1985 | Firmin . |
| 4,771,567 | 9/1988 | Cannon . |
| 4,862,630 | 9/1989 | Welch .................................... 43/42.26 |
| 5,228,230 | 7/1993 | Vaught .................................... 43/42.26 |

*Primary Examiner*—Thomas Price
*Attorney, Agent, or Firm*—William L. Krayer

[57] ABSTRACT

A fishing lure comprises a lure body and at least one pair of arms configured to simulate the belligerent position of the raised upper arms and suspended lower arms of a crustacean.

10 Claims, 10 Drawing Sheets

FISHING LURE ASSEMBLY

RELATED APPLICATION

This is a continuation-in-part of my application of the same title filed Jan. 26, 1998, Ser. No. 09/013,255, now U.S. Pat. No. 5,822,913 which claims the benefit of my provisional patent application Ser. No. 60/039,163 filed Feb. 26, 1997 entitled "Fishing Lure Accessory".

TECHNICAL FIELD

This invention relates to fishing lures, and particularly to fishing lures which simulate small crustaceans such as crayfish and/or crawfish.

BACKGROUND OF THE INVENTION

It has been known prior to the present invention to design fishing lures to mimic crawfish, crayfish and other small crustaceans.

One type of prior art device has a "skirt" in imitation of a plurality of relatively limp tendrils. Such skirts can be made from silicone rubber and can be affixed to the jig in various ways.

Other types of lures employ relatively flat, basically two-dimensional molded pieces which imitate a silhouette of the desired crustacean. An example of this type is given by Vaught in U.S. Pat. No. 5,228,230. It will be seen from FIG. 2 of this patent that the crayfish is designed to droop over a jig so that the crayfish arms are extended downwardly.

The relatively stiff arms of the simulated crayfish extend slightly upwardly in Boehm's U.S. Pat. No. 1,976,695.

There is a need for a simulated crayfish/crawfish/crawdad lure which imitates a belligerent posture, i.e. wherein the upper arm is raised and the lower arm extends downwardly.

SUMMARY OF THE INVENTION

My invention is a fishing lure which simulates the claw arms of a crayfish, crawfish, crawdad or the like in a belligerent posture. It comprises a pair of arms and means for fastening said arms to a jig or other device proximate to a hook, said arms having relatively stiff upper arm segments oriented to flare upwardly and away from each other, and lower arm segments flexibly joined to said upper arm segments.

The means for fastening said arms to a jig or other device such as a spinner bait lure preferably comprise a central harness connecting said upper arm segments and having an elastic central opening which can be stretched for the insertion of a jig.

In another variation, the jig or other device and the arms may be combined in the factory rather than by the user. That is, the relatively stiff upper arm segments may protrude directly and integrally from the jig.

In this continuation-in-part application, I present variations of my invention in which the arms of the simulated crustaceans are located on different areas of the bodies of the simulated crustaceans.

BRIEF DESCRIPTION OF THE DRAWINGS

Three different postures of my invention are shown in FIGS. 7a, 7b, and 7c.

DETAILED DESCRIPTION OF THE INVENTION

Figure 1A:
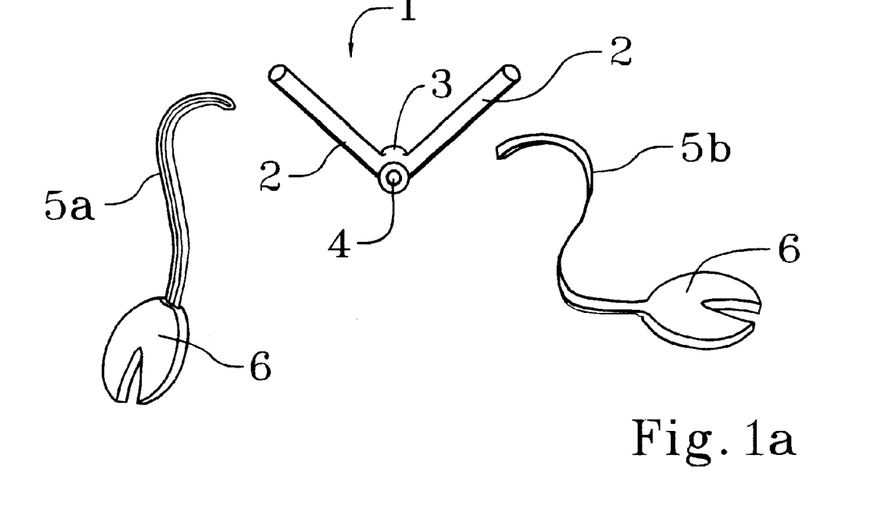
FIG. 1a shows the disassembled components of a variation of my invention.

Referring first to FIG. 1a, some basic components of a possible variation of my invention are disassembled for illustration. Harness 1 comprises two hollow upper arms 2 flaring upwardly and away from each other to form a V. At the jointure of the two upper arms 2 is collar 3 having an orifice 4 passing through it. Collar 3 is preferably elastic and upper arms 2 are relatively stiff. Lower arms 5a and 5b are preferably loosely flexible as shown, and have simulated claws 6 at the ends. Lower arm 5a is a single molded rubber flexible cord, and lower arm 5b is flat to illustrate examples of flexible lower arms within my invention. As explained and/or illustrated elsewhere herein, it is not necessary that the upper arms 2 be hollow and that the lower arms 5a and 5b be inserted into them. Any practical method of attaching the upper (2) and lower arms (5a, 5b) at elbow 7 (see FIG. 1b) is satisfactory, such as gluing; also the upper and lower arms (2; 5a, 5b) may be molded as a unit, taking care that the dimensions and/or materials will assure that the upper arms 2 are relatively stiff and the lower arms 5a and 5b are loosely flexible. By relatively stiff for the upper arms 2 and their juncture with collar 3 I do not mean rigid, since it is intended for upper arms 2 to flex enough to permit a fish to place the lure in its mouth, and frequently this means that the harness 1 should give way temporarily. The harness 1 should be of a construction to flex when mildly constricted but to snap back to its original shape after being constricted. Note also that the claws 6 may be molded separately or integrally with the lower arms 5a and 5b, and may more accurately simulate a crustacean if they are thicker than lower arms 5a and 5b as shown.

Figure 1B:
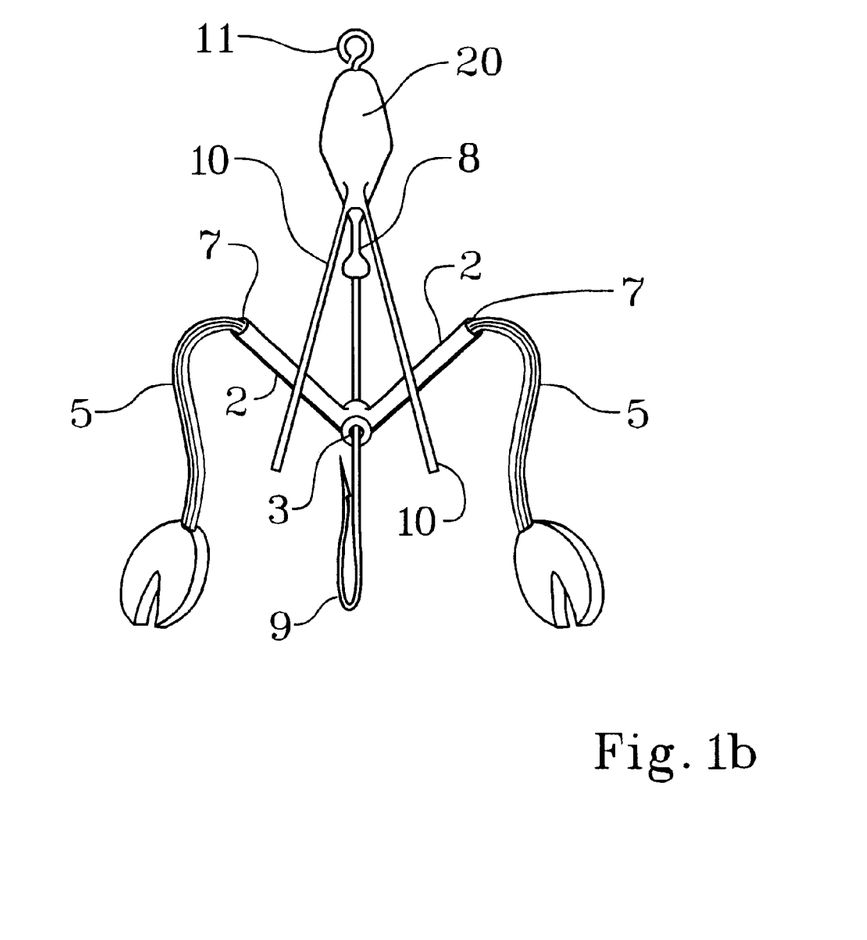
FIG. 1b shows an assembly of my invention.

As seen in FIG. 1b, the lower arms 5 are attached to the ends of upper arms 2; here the attachment is accomplished by inserting the lower arms 5 into the upper arms 2 at elbows 7 and secured by gluing, fusing, or other satisfactory fastening method. The relatively loose flexibility of lower arms 5 combined with the stiffness of upper arms 2 permits the dangling effect illustrated in FIG. 1b. For assembling, hook 9 passes through collar 3 and jig base 8 will be surrounded by collar 3. Jig base 8 includes a more or less conventional weed guard 10. Jig head 20 has an eye 11 for a fishing line.

Figure 2:
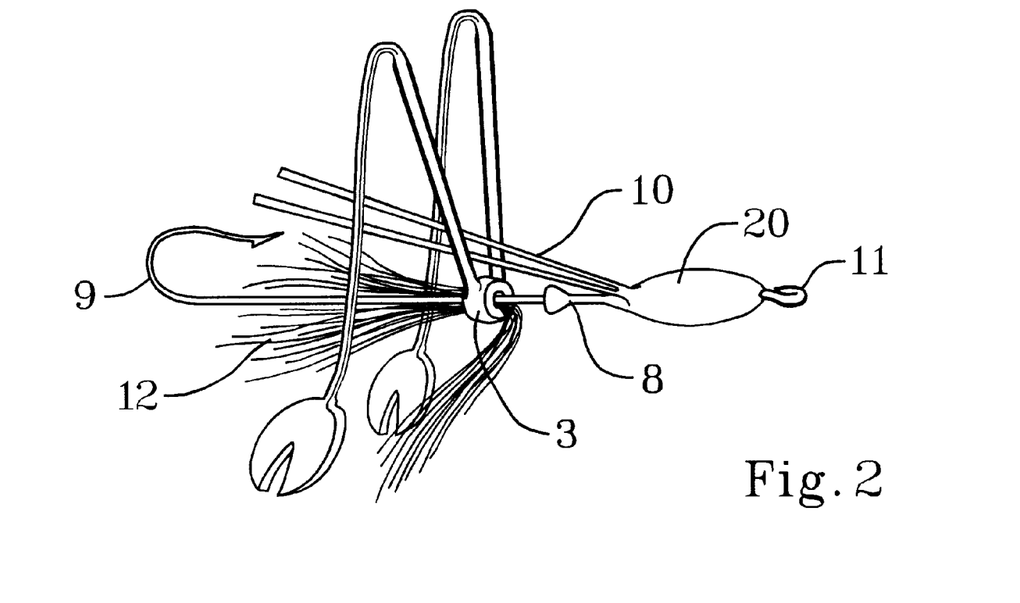
In FIG. 2, the lure is shown in a belligerent posture; a skirt has been added.

FIG. 2 shows the jig base 8 being inserted into collar 3, together with a more or less conventional skirt 12. Note that in this variation, the collar 3, upper arms 2, elbow 7, lower arms 5, and claws 6 are all molded as a single unit. Also, collar 3, being elastic, can be expanded if necessary to permit the blunt end of jig base 8 to pass through it; collar 3 then constricts to firmly grasp jig base 8 as shown in FIG. 3.

It may be observed that orifice 4 passes through the plane defined by the V formation of upper arms 2.

Figure 3:
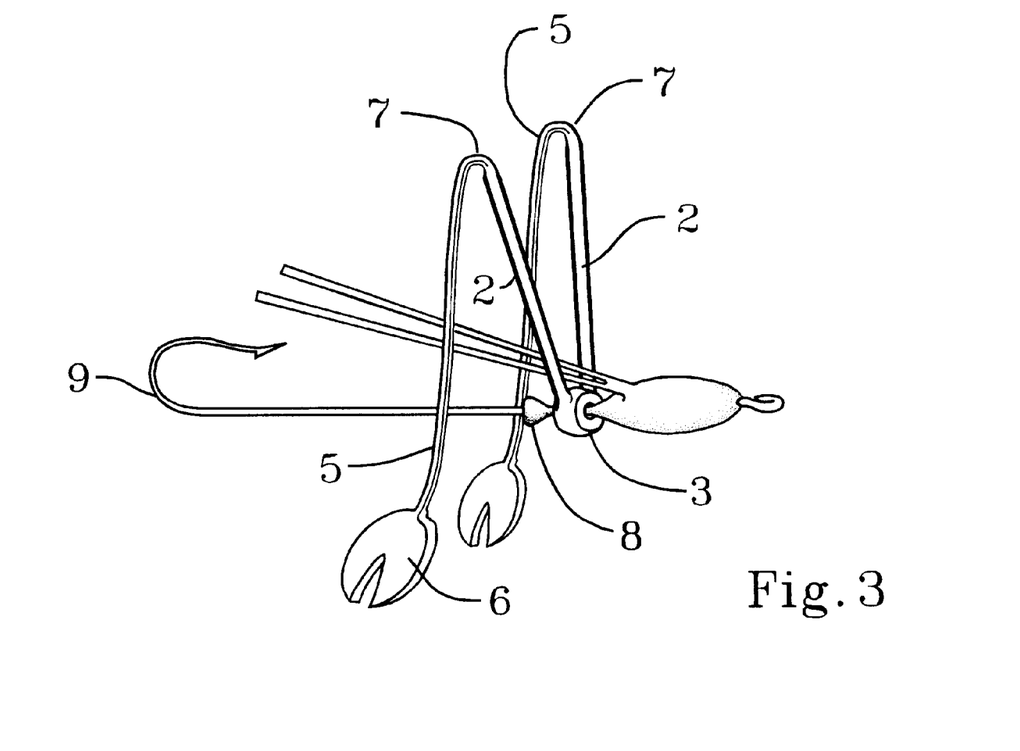
FIG. 3 shows the assembled components without the skirt.

FIG. 3 is a view of the assembled lure, without optional skirt 12, showing the fully extended lower arms 5 in a belligerent position; this is possible because of the flared deployment of upper arms 2 to form a V, as previously described. The lower arms 5 are suspended from elbows 7. Collar 3 is clamped tightly around jig base 8.

Figure 4A:
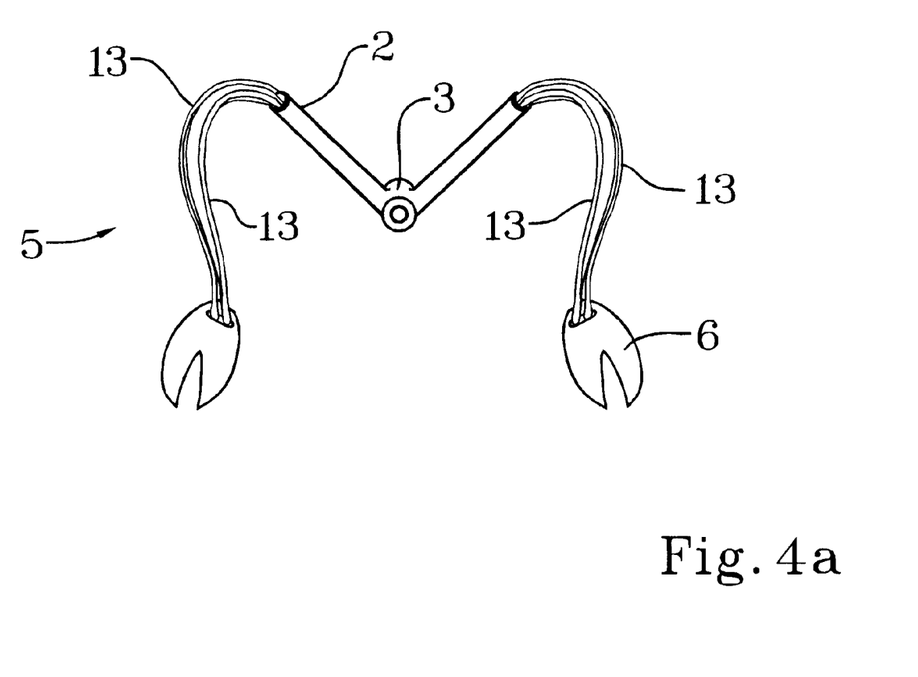
FIGS. 4a and 4b illustrate different styles of lower arms.
Figure 4B:
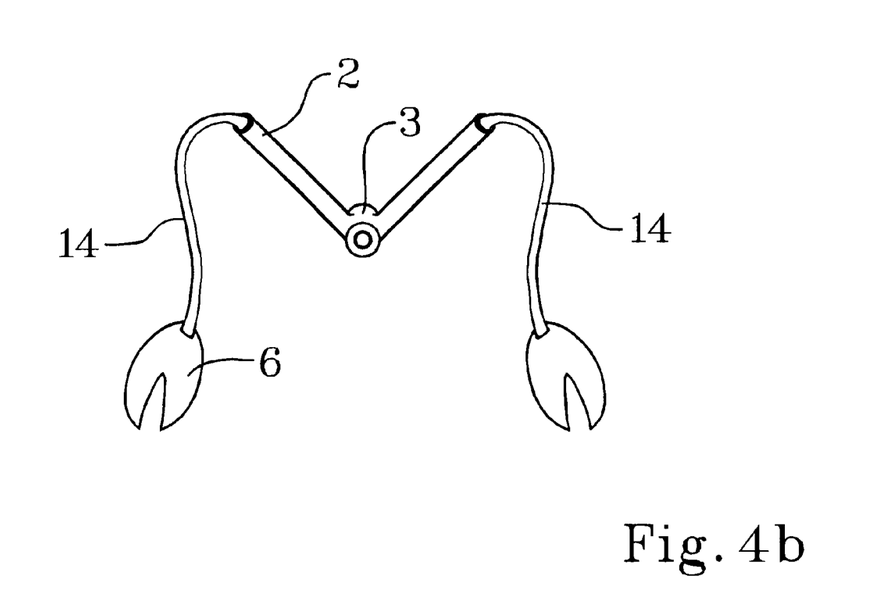

In FIG. 4a, lower arms 5 are shown in the form of strands 13 of flexible material and in FIG. 4b they are single strands or monofilaments 14. The lower arms 13 of FIG. 4a and/or FIG. 4b (and the variation described elsewhere herein) may be made of any material which will provide lower arms of loose flexibility, i.e. either single or multiple strands, silicone rubber, synthetic polymers, natural rubber, etc. either extruded, molded, or fabricated, and attached to the claws and upper arms in any practical and/or satisfactory manner.

Figure 5:
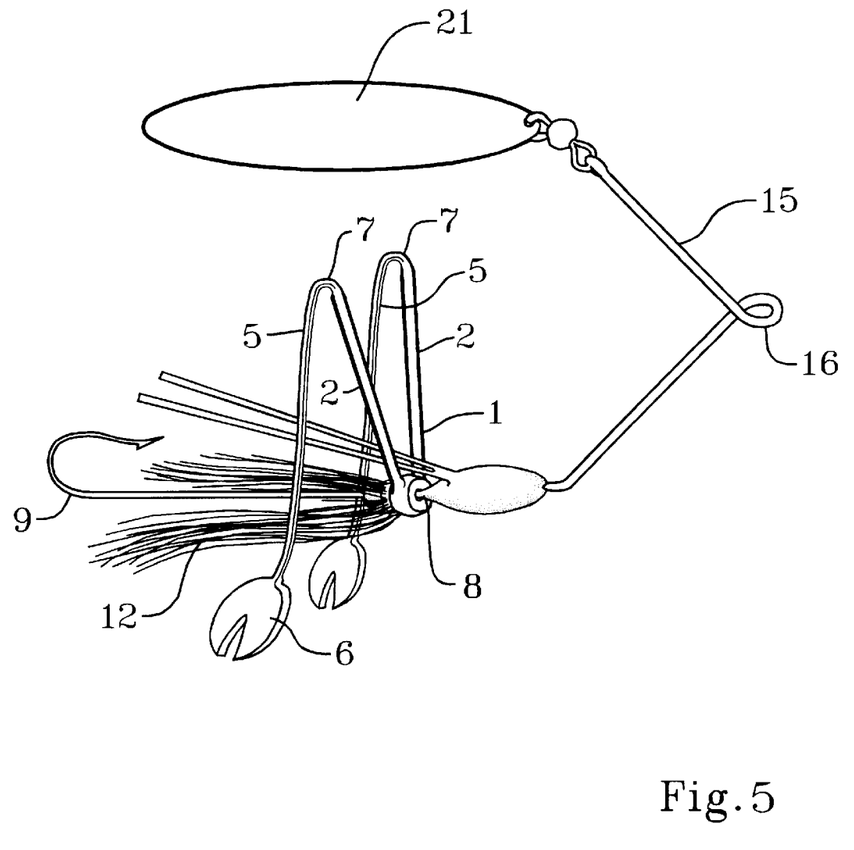
In FIG. 5, the invention is illustrated with a spinner bait.

FIG. 5 depicts my lure with the skirt 12 extended backwardly. The skirt 12 may be molded integrally with harness 1. The relatively stiff upper arms 2 and relatively loosely flexible lower arms 5 are also molded integrally in this example, so that no attachment is required at elbows 7; see also FIGS. 2 and 3. Claws 6 are also part of the original single molded piece which includes the harness 1, lower arms 5, and claws 6. This version has a more or less conventional spinner 21 attached to jig base 8 by wire 15 including a loop 16 for attaching the fishing line. FIG. 5 also illustrates a more acute angle of flare between upper arms 2 than in some of the other figures. The claws 6 are thicker than lower arms 5.

Figure 6A:
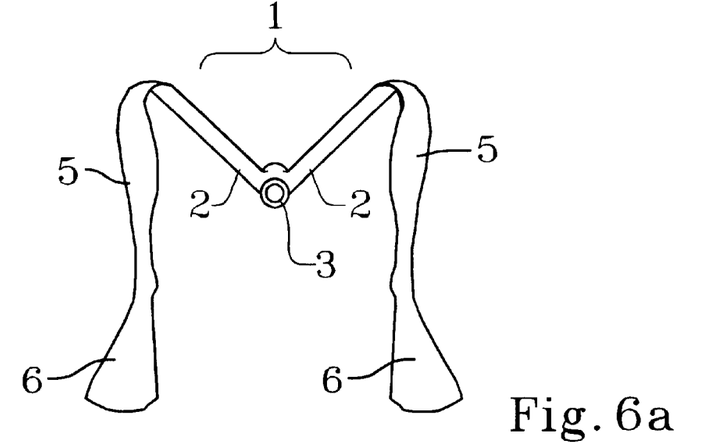
FIGS. 6a, 6b, and 6c illustrate optional designs and protrusions for the lower arms within my invention.
Figure 6B:
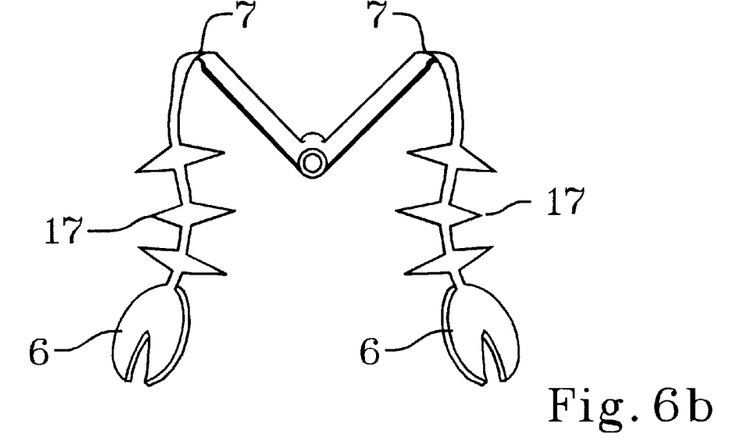
Figure 6C:
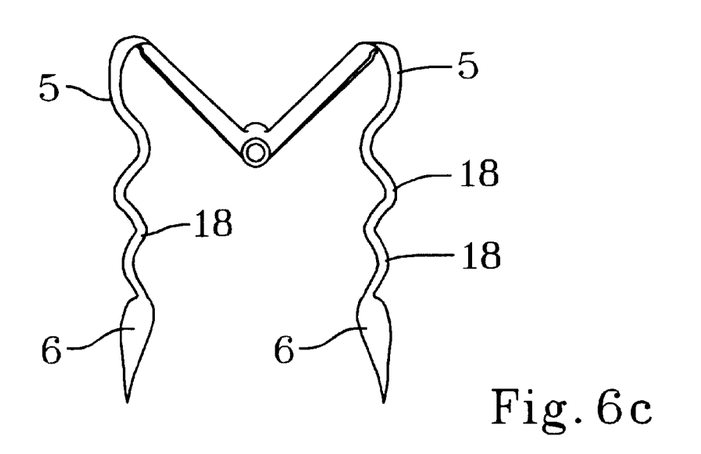

Variants of the construction are shown in FIGS. 6a, 6b, and 6c. In FIG. 6a, the harness 1, the upper arms 2, lower arms 5, and simulated claws 6 are integrally molded, the upper arms 2 being relatively stiff because of their thickness, lower arms 5 being relatively thin and therefore flexible. As stated before, collar 3 is elastic to permit easy insertion of the jig and to grasp the jig after insertion.

As in FIG. 6a, the design of FIG. 6b has highly flexible elbows 7. Here the claws 6 are more exact replicas of real claws, and lower arms 5 include protrusions 17.

While the variation of FIG. 6c has flexible lower arms 5, they include permanent curves 18. That is, the curves 18 can be easily flexed or bent, but they will return at rest to the shape shown. The shape of claws 6 may vary with the particular crustacean which it is desired to emulate.

Figure 7A:
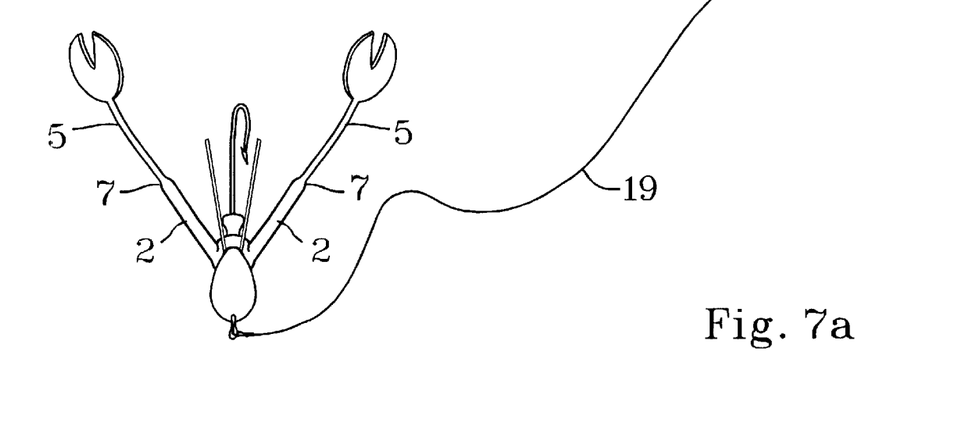
Figure 7B:
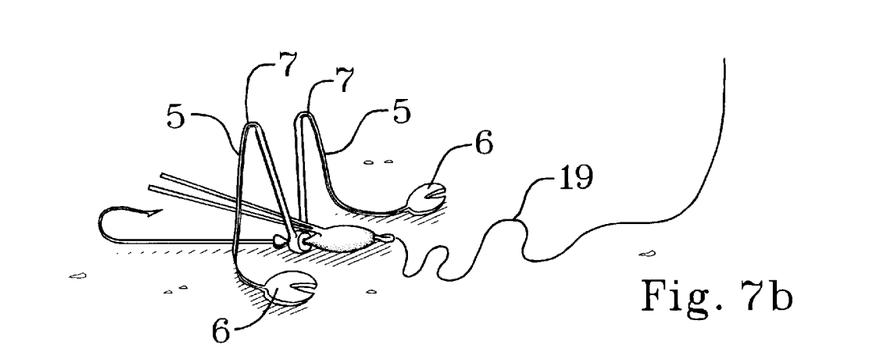
Figure 7C:
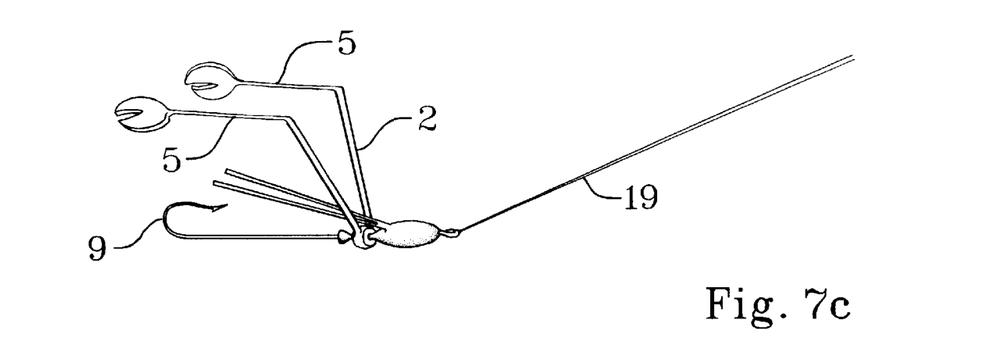

FIGS. 7a, 7b, and 7c illustrate a major objective of the invention—the ability to simulate a crustacean in different postures in the water. In FIG. 7a, the lure is loosely falling in the water, in FIG. 7b, it has settled on the floor of the body of water, and in FIG. 7c, the user is either pulling it through the water or holding it in place in a flowing stream.

It can be seen that in FIG. 7a, representing the descending lure, the lower arms 5 are straight out from elbows 7, appearing to be extensions of upper arms 2, while line 19 exerts no tension on the lure. Resting on the waterbed floor as in FIG. 7b, line 19 is also limp. In this case, claws 6 rest on the floor and lower arms 5 extend downwardly more or less at an angle from elbows 7. Under the influence of the flow of water, the lower arms 5 of FIG. 7c extend backwardly while the line 19 is taut. The effect is the same for FIGS. 7a, 7b, and 7c where the lure contains a skirt such as skirt 12 in FIGS. 2 or 5.

The belligerence-simulative arms of my invention comprise the two relatively stiff upper arms 2, the lower arms 5, claws 6, and elbows 7. The upper arms 2 are preferably integrally joined to harness 1 which is preferably made of elastic material defining a small orifice 4 so the hook 9 can be easily passed through it and so that it can be stretched to fit tightly over and around the jig base 8.

In the illustrations of several figures, the upper arms 2 are seen to be raised at an angle of about 60° from horizontal. Generally, the upper arm segments should be deployed at an angle from about 30° to about 150° from the horizontal in order to simulate the belligerent posture of the crustacean.

The preferred angle between the relatively stiff upper arms 2 is about 90°. However, this angle may vary from about 10 to about 145 degrees, preferably 45 to 145°. Orifice 4 in collar 3 may be of any convenient size; however, it should not be larger than the diameter of the jig base 8 or other device it is intended to be affixed to. Orifice 4 need not be present if the harness 1 is soft enough that the hook can easily penetrate it and the harness 1 can be easily pulled over the jig base 8 (see FIGS. 2 and 3). It is only necessary that the lower arm segments droop from the termini of the upper arm segments and accordingly lower arms 5 may be relatively stiff so long as there is a measure of flexibility at the elbows 7. Claws 6 can be considerably thicker than illustrated but need not simulate claws as well as those illustrated. It should be understood that an entire structure such as FIG. 4a, 4b, 6a, 6b, or 6c may be made in a single mold to avoid assembling, so long as care is taken to provide flexibility at the elbows 7. While the upper arms 2 are stiff relative to the joints 7, a measure of flexibility will help to simulate the motion of the crustacean springing the arms forward and backward and/or raising and lowering the upper arm segments particularly while the lure is moved through the water. This simulation is aided by the flexing of the harness. The upper and lower arms 2 and 5 may vary in length and ratio; in particular, the upper arms 2 are preferably (for most fresh water fishing) in the range of one-half to one inch and the lower arms may be one-half to three times the length of the upper arms. For larger fresh and salt water fish, the lure can be much larger and the proportions of upper to lower arms may vary considerably.

Before referring to FIGS. 8–13, reverting to the discussion above of FIG. 2, it was observed that orifice 4 in FIG. 2 passes through the plane defined by the V formation of upper arms 2. FIGS. 8–13 include some variations where this observation is not to be made; also some of the variations have no orifice.

Figure 8A:
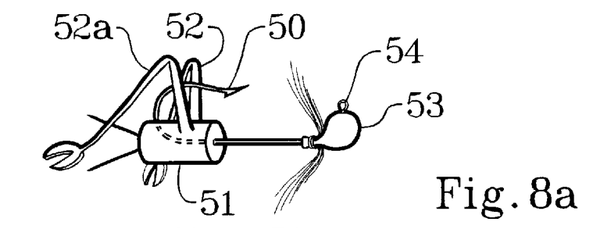
FIGS. 8a, 8b, 8c, and 8d show the threaded style of my invention wherein the simulated crustacean may have a relatively long body with the arms in various locations on the body.
Figure 8B:
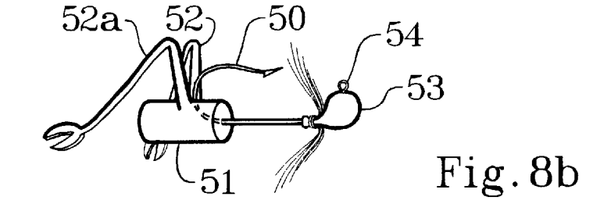
Figure 8C:
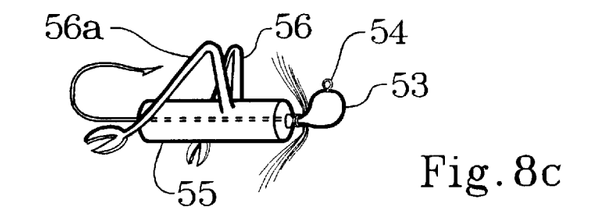
Figure 8D:
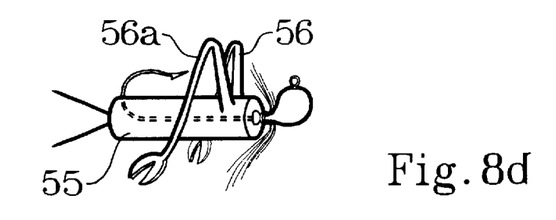

Referring now to FIGS. 8a–d, it will first be noted that the location of the arms on the lure body may vary, and the position of the arms relative to the hook may vary. Moreover, an orifice is not necessary. In FIG. 8a, the hook 50 is inserted from the front end of short lure body 51 and protrudes between the upper arms 52. Hook 50 is integrally attached to jig head 53, which has an eye 54 for attaching a line not shown. Lower arms 52A are suspended from the generally upraised upper arms 52, as explained elsewhere herein. FIG. 8b depicts an assembly wherein the hook 50 protrudes in front of upper arms 52, while the somewhat larger lure body 55 of FIG. 8c may support upper arms 56 approximately in the middle of larger lure body 55 or, as in FIG. 8d, closer to the front of larger lure body 55. Hanging lower arms 56A are loosely flexible relative to the preferably somewhat stiffer raised upper arms 56, consistent with the arm construction explained elsewhere herein. In any case, the hook may be inserted directly through the more or less solid but penetrable material of short lure body 51 or larger lure body 55. Or, the lure body may have a pre-punched indentation or partial hole to assist in attaching the hook 50 to the lure body. As seen in FIGS. 8e–8h, the lure body 55A may be shaped like a baby crayfish and have antennas 57; otherwise, the placement of upper arms 58 varies similarly to those of FIGS. 8a–8d, and the insertions of the hooks 59 are also similar.

Figure 8E:
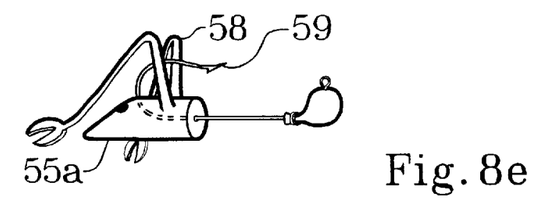
FIGS. 8e–8h show a lure body shaped like a baby crayfish with arms in different locations on the crayfish body.
Figure 8F:
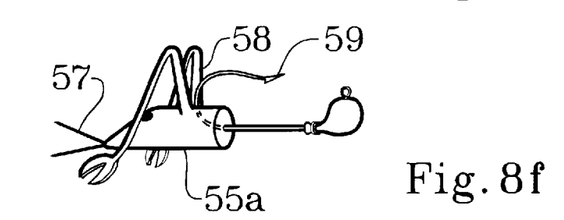
Figure 8G:
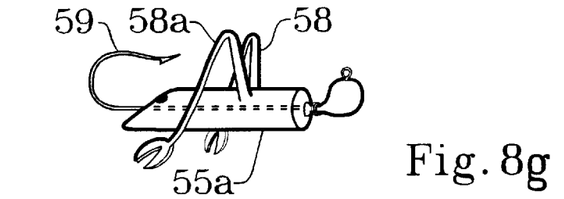
Figure 8H:
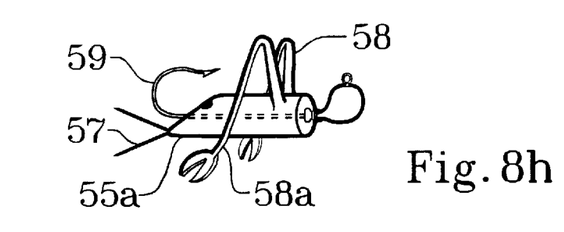

In all cases, the lower arms 52A and 56A of FIGS. 8a–8d and 58A of FIGS. 8e–8f are suspended more or less limply as previously described from relatively stiff raised upper arms 52, 56 and 58 respectively.

Figure 9A:
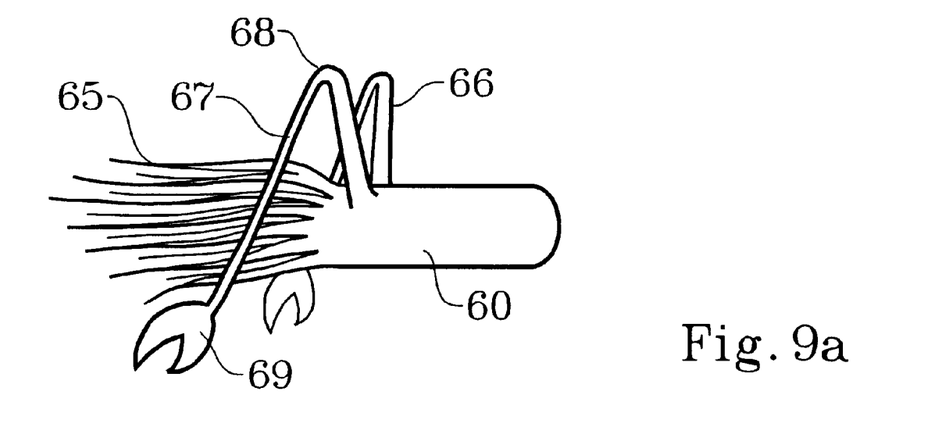
In FIGS. 9a, 9b, and 9c, variations of tube jigs are shown in which the distinctive raised upper arms and hanging lower arms are in different locations on the lure.
Figure 9B:
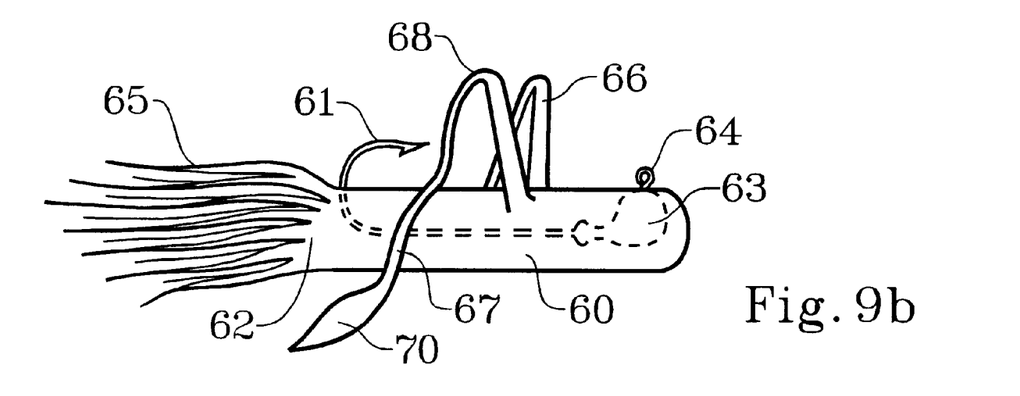
Figure 9C:
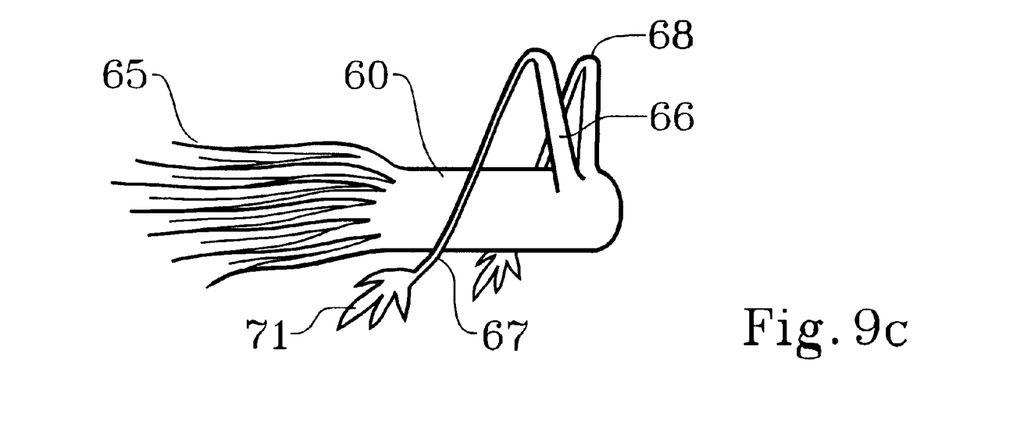

The tube jig of FIGS. 9a–9c also may have arms anywhere along the length of lure body 60, which is shaped like a tube except that in this case the back end is divided to form a skirt of filaments 65. As with conventional tube lures, the hook 61 is inserted through back end 62 until the jig head 63 rests near the front of the lure body. Then the hook 61 is caused to pierce the side of lure body 60, and the eye 64 on the jig head 63 pierces through the wall of lure body 60 so the line may be attached. The upper arms 66 are shown near the back of the lure body 60 in FIG. 9a, in the middle in FIG. 9b, and at the head end in FIG. 9c. As before, the relatively stiff upper arms 66 are raised inn a belligerent posture, and the lower arms 67 hang from the elbows 68. The terminae of lower arms 67 may vary considerably in design as shown by variations 69 (FIG. 9a), 70 (FIG. 9b) and 71 (FIG. 9c). Elbows 68 can be arch-shaped and made of a stiffness similar to that of upper arms 66 in this and the other variations shown herein. Also it should be understood that my invention may be used in lures which incorporate other known lure parts not only such as the skirt filaments 65 but also spinners and weedguards. The arms may vary considerably in construction and material—for example, the same or different molding material may be used for the upper and lower arms; the upper arms may be thicker or incorporate a reinforcement, or the lower arms may exhibit an oval shape so long as they can dangle from the elbows. Likewise, small eights may be imbedded in the lower arms or their extremities or pockets may be provided for them so the user may employ them or not.

Where no weights are used, it is possible the lower arms will be extended in a flared orientation when the lure is pulled through the water. This is quite within my invention so long as the belligerent posture described herein is resumed when the lure is in the water but not moving.

Figure 10:
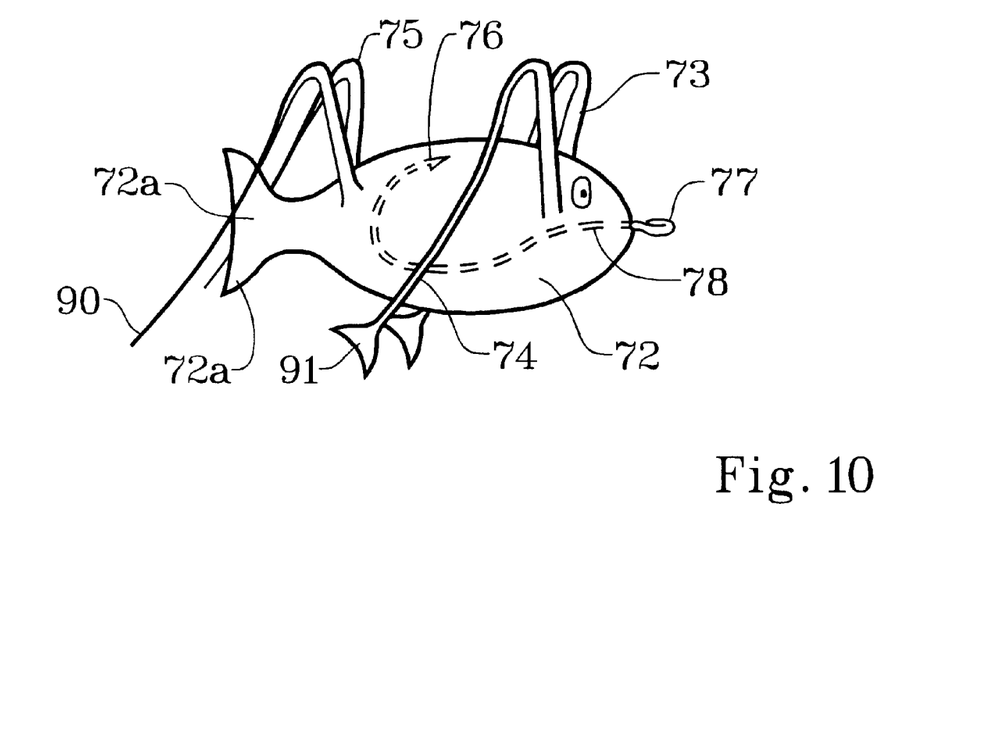
FIG. 10 shows a "minnow" style lure.

In FIG. 10, the lure body 72 simulates a minnow, but the upper arms 73 and lower arms 74 are as previously described, in a belligerent posture. The upper arms 73, and the upper arms in all other Figures herein, may flare upwardly with respect to the lure body 72 at an angle from 30 to 150 degrees therefrom—that is from a line drawn from, in the case of minnow lure body 72, the eye 77 to the center 72A of tail 72B. For other configurations such as the lure bodies of FIGS. 8a–h, 9a–c, 11, 12, and 13 as well as FIGS. 1–7, the line may be simply drawn lengthwise through the axis of the lure body. Such a line may be referred to as the horizontal. The angle between the upper arms may vary from about 30 to 145 degrees.

FIG. 10 shows also that a second pair of arms 75 may be placed on the lure. In this case also the hook 76 is built into the lure body 72 so that the eye 77 protrudes at the simulated mouth 78 of the lure body 72. Additional variations 90 and 91 are shown in FIG. 10 for the terminae of the lower arms 74. My invention therefore includes the use of the raised, rather stiff upper arms and hanging lower arms of a belligerent crustacean, but the body of the lure may simulate other types of bait. Moreover, the arms may be in various positions on the lure, and/or multiple pairs of arms may be used.

Figure 11:
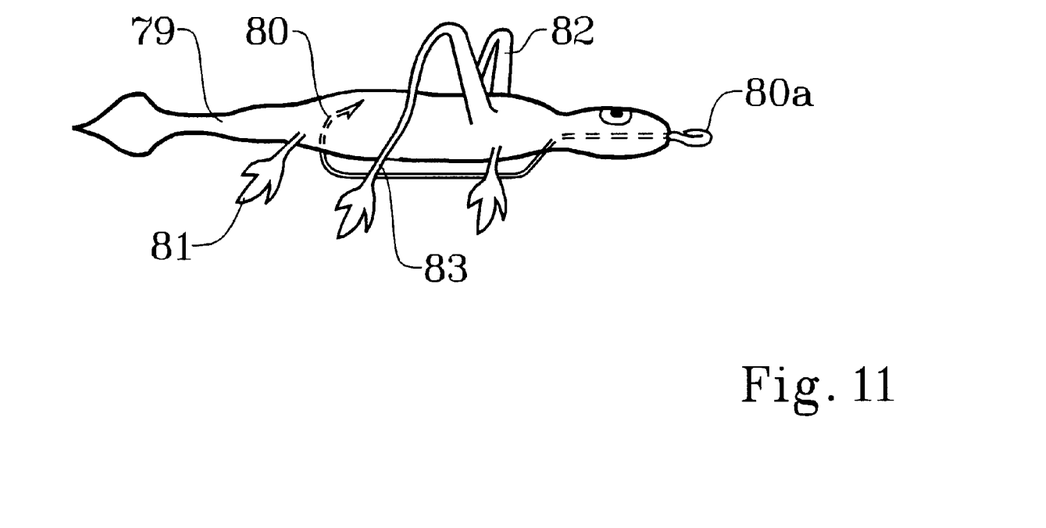
FIG. 11 shows a lizard style.

FIG. 11's lure body 79 simulates a lizard. Hook 80 and eye 80A are built into the lure body 79. While the short appendages 81 help to simulate a lizard, the raised upper arms 82 and suspended lower arms 83 provide the simulation of the arms of a belligerent crustacean.

Figure 12:
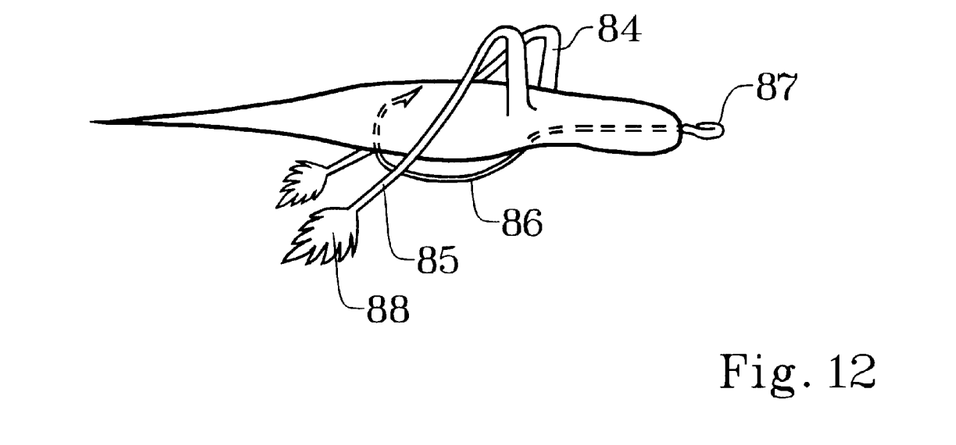
FIG. 12 shows a "jerk bait" minnow style lure.

In FIG. 12, a "jerk bait" minnow design lure is provided with the raised upper arms 84 and hanging lower arms 85 of a belligerent crustacean. Note that the upper arms 84 are somewhat shorter than in the other figures relative to lower arms 85,which are generally longer. Hook 86 and eye 87 may be built in or positioned by the user. Yet another claw design 88 is shown in this Figure.

Figure 13:
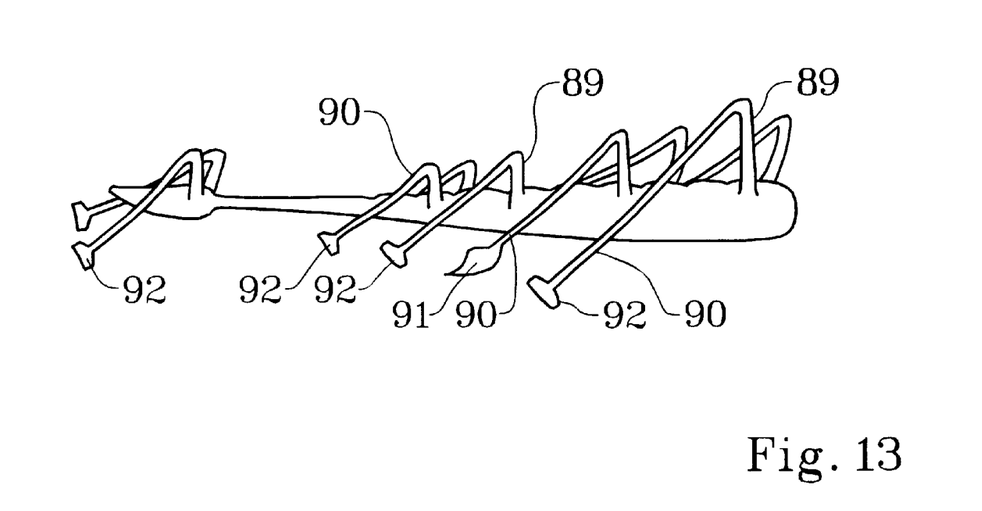
FIG. 13 illustrates a "worm" style also incorporating my invention.

Another variation of my invention is shown in FIG. 13, a worm style equipped with several sets of raised upper arms 89 and dangling lower arms 90 of my invention. While this variation shows several pairs of arms, it is to be understood that my invention includes combinations of my arm construction with one or more other appendages as, for example, in FIG. 11. Additional terminus variations 91 and 92 are shown in FIG. 13.

While my invention contemplates the raised upper arms and suspended lower arms useful to simulate the belligerent posture of a crustacean, it is to be understood that the ultimate display of this posture will be in water; accordingly, whether the posture is manifested in air is not important.

I claim:

1. A fishing lure comprising a lure body and a pair of arms thereon, said arms comprising upper arms and lower arms, said arms configured to simulate the belligerent position of the raised upper arms and suspended lower arms of a crustacean, wherein said upper arms are configured to flare upwardly with respect to said lure body at an angle of about 30 to about 150 degrees above the horizontal when the lure is in the water.

2. A fishing lure of claim 1 wherein said arms comprise relatively stiff upper arm segments, flexible joints attached thereto, and lower arm segments attached to said joints.

3. A fishing lure of claim 2 including simulative claw members at the termini of said lower arm segments.

4. A fishing lure of claim 1 wherein said arms are configured to flare apart at an angle between about 10 and 145 degrees.

5. A fishing lure of claim 4 wherein said arms are configured to flare apart at an angle between about 45 and 145 degrees.

6. A fishing lure of claim 1 including a skirt.

7. A fishing lure of claim 1 wherein said lower arm segments comprise a plurality of strands.

8. A fishing lure of claim 1 including at least one additional pair of arms on said lure body.

9. A fishing lure of claim 1 having a hook embedded therein.

10. A fishing lure of claim 9 including an eye for a line.

* * * * *